United States Patent
Lee et al.

(10) Patent No.: US 12,537,724 B2
(45) Date of Patent: Jan. 27, 2026

(54) APPARATUS WITH SPEED SELECTION MECHANISM AND METHOD FOR OPERATING

(71) Applicant: Micron Technology, Inc., Boise, ID (US)

(72) Inventors: Chulkyu Lee, Meridian, ID (US); Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 18/584,986

(22) Filed: Feb. 22, 2024

(65) Prior Publication Data

US 2024/0305507 A1    Sep. 12, 2024

Related U.S. Application Data

(60) Provisional application No. 63/450,617, filed on Mar. 7, 2023.

(51) Int. Cl.
*H04L 25/03* (2006.01)
*G06F 13/16* (2006.01)

(52) U.S. Cl.
CPC .... *H04L 25/03267* (2013.01); *G06F 13/1668* (2013.01); *H04L 25/03057* (2013.01)

(58) Field of Classification Search
CPC ......... H04L 25/03267; H04L 25/03057; G06F 13/1668; G06F 13/4072
See application file for complete search history.

(56) References Cited

U.S. PATENT DOCUMENTS

| | | | |
|---|---|---|---|
| 7,098,752 B2 * | 8/2006 | Oehm | H03B 5/1271 331/185 |
| 7,694,031 B2 * | 4/2010 | Talbot | G06F 13/1673 710/63 |
| 9,143,362 B2 * | 9/2015 | Wiley | H04L 25/02 |

FOREIGN PATENT DOCUMENTS

| | | | | |
|---|---|---|---|---|
| EP | 4404478 A1 * | 7/2024 | | B64G 1/428 |
| WO | WO-2024124046 A1 * | 6/2024 | | H04L 25/4917 |

OTHER PUBLICATIONS

Kim, K. et al., "A 24Gb/s/pin 8Gb GDDR6 with a Half-Rate Daisy-Chain-Based Clocking Architecture and IO Circuitry for Low-Noise Operation", ISSCC 2021 / Session 25 / DRAM / 25.1, San Francisco, 3 pages.

* cited by examiner

*Primary Examiner* — Jean B Corrielus
(74) *Attorney, Agent, or Firm* — Dorsey & Whitney LLP

(57) ABSTRACT

Methods, apparatuses, and systems related to an apparatus for managing on-die inter-symbol interference (ISI) are described. The apparatus may include (1) a single communication path with a set of drivers and (2) an on-die ISI prevention circuit coupled to the communication path in parallel. The single communication path may be used to propagate a slower speed signal and a higher speed signal. The on-die ISI prevention circuit may be configured to adjust the propagated signal for one of the speeds to reduce the ISI in the communicated signal.

20 Claims, 7 Drawing Sheets

APPARATUS WITH SPEED SELECTION MECHANISM AND METHOD FOR OPERATING

CROSS-REFERENCE TO RELATED APPLICATION(S)

The present application claims priority to U.S. Provisional Patent Application No. 63/450,617, filed Mar. 7, 2023, the disclosure of which is incorporated herein by reference in its entirety.

TECHNICAL FIELD

The disclosed embodiments relate to devices, and, in particular, to semiconductor memory devices with speed selection mechanisms and methods for operating the same.

BACKGROUND

Inter-symbol interference (ISI) is a form of signal distortion, where one symbol interferes with subsequent symbols. Typically, ISI occurs when a symbol (e.g., a corresponding pulse) interferes with adjacent signals occurring during the sample instant. In some cases, ISI is caused by one or more symbols partially overlapping other symbols, such as when one or more pulses extend into subsequent time slots. As a result, the overlapping portion of the symbols interferes with other subsequent symbols, thereby corrupting the corresponding data. Thus, the ISI creates a bandwidth limitation and presents an obstacle against increasing the signal speeds of semiconductor devices.

DETAILED DESCRIPTION

Figure 1:
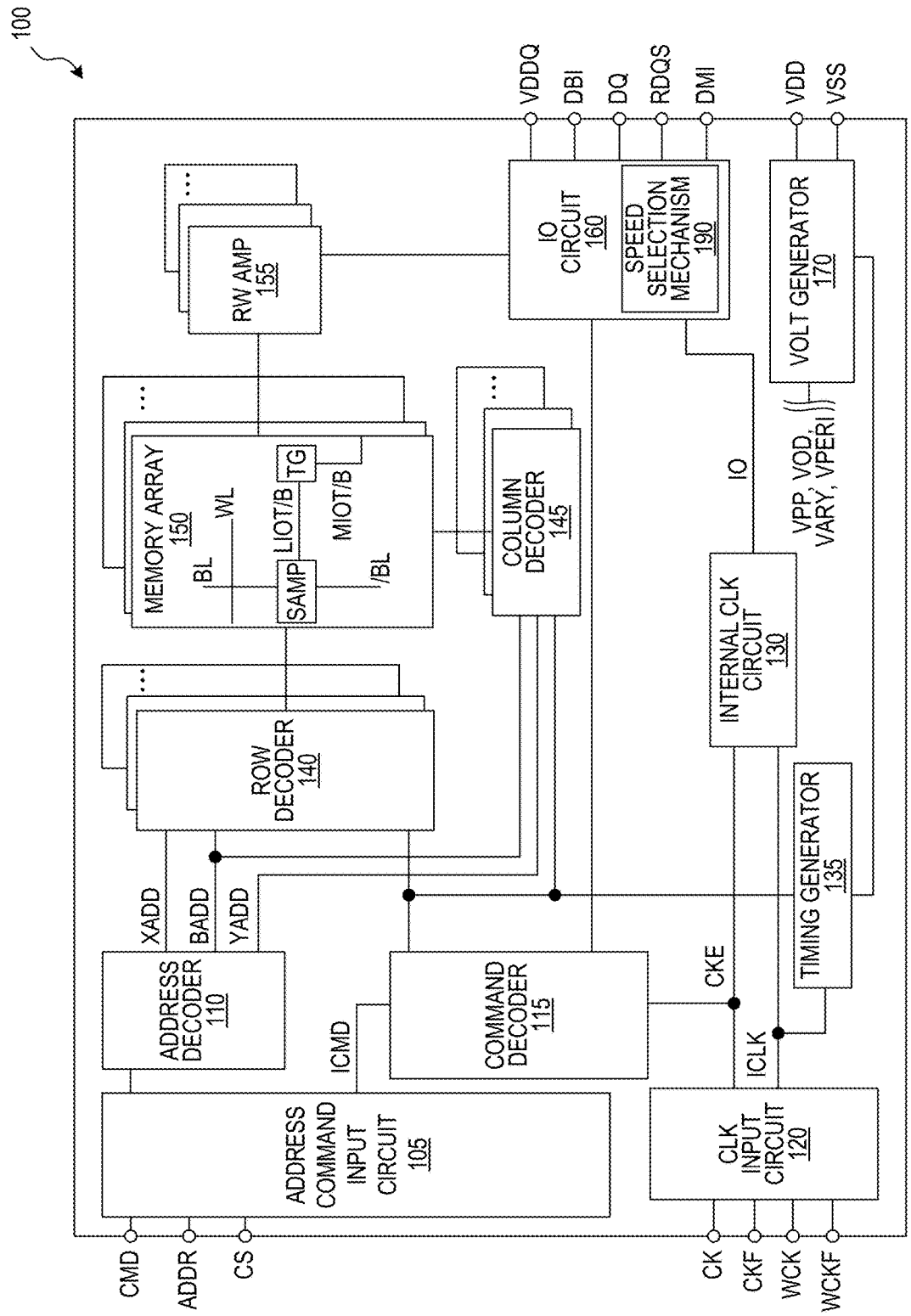
FIG. 1 is a block diagram of an apparatus in accordance with an embodiment of the present technology.

As described in greater detail below, the technology disclosed herein is related to a mechanism for preventing ISI within a circuit (e.g., within a semiconductor die) according to a communication speed. The mechanism can correspond to a communication signal path having (1) a common physical path configured to communicate signals of multiple speeds/rates and (2) an adjustment circuit coupled to the common physical path and configured to adjust the signal propagating through the common physical path according to a speed/rate of the signal.

In some applications, an apparatus may be required or designed to use a common point (e.g., a contact or a pin) to communicate signals having different speeds/rates. For example, memory devices may be required to communicate input/output (I/O) signals according to different or variable speed requirements through a common point. Accordingly, the corresponding communication path may be required to operate in multiple modes, such as in high-speed mode, low-speed mode, etc. Along with the different speed requirements, the communication path may be required to provide a minimum amount of drive or power for subsequent circuits for one or more of the operating speeds.

The variability in speed and the required drive capacity can provide competing interests. As an illustrative example, when MOS devices are utilized, the bandwidth of higher speed signal path may be limited by the on-die ISI. To decrease the ISI and accommodate the higher speed, the communication path can be designed to have a lower stage ratio or a lower fan-out circuitry. Conventional low fanout designs often include a relatively long chain of drivers corresponding to larger gates that consume greater amounts of power and have larger physical footprints. In comparison, the lower speed signals may be accommodated using a higher stage ratio or a higher fan-out circuitry that consumes less power than the lower fan-out circuitry.

Embodiments of the present technology can include a selectively tunable communication path that can provide different communicative properties along a common path. For example, the selectively tunable communication path can include a set of drivers (e.g., inverters) corresponding to the higher fan-out configuration associated with the lower speed signals. The selectively tunable communication path can include an adjustment circuit that can be selectively activated to account for or to offset the higher fan-out configuration. For example, the adjustment circuit can include an on-die equalizer, a feedback loop, a filter, or a combination thereof that is activated for high-speed signals. The adjustment circuit can extend the bandwidth of the higher fan-out configuration to accommodate the high-speed signals. In some embodiments, the adjustment circuit can extend the bandwidth by de-emphasizing low frequency components of the propagating signals. Accordingly, a common physical path (e.g., the set of the drivers) can be selectively adapted to facilitate different signal speeds instead of selectively routing the communicated signals to different physical paths according to the speeds of such signals.

Using the selectively tunable communication path, the apparatus can provide a reduced circuit footprint (e.g., a factor of 2 or more) based on eliminating separate speed-dependent signal paths/drivers. Moreover, the apparatus can reduce the power consumption levels (e.g., 30%, 40%, and more) using the higher fan-out configuration in the commonly shared physical path. This can have less drivers than the lower fan-out configurations. Moreover, the selectively tunable communication path can eliminate initialization that may be required for other multi-speed communication paths.

FIG. 1 is a block diagram of an apparatus 100 (e.g., a semiconductor die assembly, including a three-dimensional integration (3DI) device or a die-stacked package) in accordance with an embodiment of the present technology. For example, the apparatus 100 can include a dynamic random-access memory (DRAM) or a portion thereof that includes one or more dies/chips.

The apparatus 100 may include an array of memory cells, such as memory array 150. The memory array 150 may include a plurality of banks (e.g., banks 0-15), and each bank may include a plurality of word-lines (WL), a plurality of bit lines (BL), and a plurality of memory cells arranged at intersections of the word-lines and the bit lines. Memory cells can include any one of a number of different memory media types, including capacitive, magnetoresistive, ferroelectric, phase change, or the like. The selection of a word-line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The sense amplifiers and transfer gates may be operated based on control signals from a decoder circuitry, which may include the command decoder 115, the row decoders 140, the column decoders 145, any control circuitry of the memory array 150, or any combination thereof. The memory array 150 may also include plate lines and corresponding circuitry for managing their operation.

The apparatus 100 may employ a plurality of external terminals that include command and address terminals coupled to a command bus and an address bus to receive command signals (CMD) and address signals (ADDR), respectively. The apparatus 100 may further include a chip select terminal to receive a chip select signal (CS), clock terminals to receive clock signals CK and CKF, data clock terminals to receive data clock signals WCK and WCKF, data terminals DQ, RDQS, DBI, and DMI, power supply terminals VDD, VSS, and VDDQ.

The command terminals and address terminals may be supplied with an address signal and a bank address signal (not shown in FIG. 1) from the outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145.

The command and address terminals may be supplied with command signals (CMD), address signals (ADDR), and chip select signals (CS), from a memory controller and/or a nefarious chipset. The command signals may represent various memory commands from the memory controller (e.g., including access commands, which can include read commands and write commands). The chip select signal may be used to select the apparatus 100 to respond to commands and addresses provided to the command and address terminals. When an active chip select signal is provided to the apparatus 100, the commands and addresses can be decoded, and memory operations can be performed. The command signals may be provided as internal command signals ICMD to a command decoder 115 via the command/address input circuit 105. The command decoder 115 may include circuits to decode the internal command signals ICMD to generate various internal signals and commands for performing memory operations; for example, a row command signal to select a word-line and a column command signal to select a bit line. The command decoder 115 may further include one or more registers for tracking various counts or values (e.g., counts of refresh commands received by the apparatus 100 or self-refresh operations performed by the apparatus 100).

Read data can be read from memory cells in the memory array 150 designated by row address (e.g., address provided with an active command) and column address (e.g., address provided with the read). The read command may be received by the command decoder 115, which can provide internal commands to I/O circuit 160 so that read data can be output from the data terminals DQ, RDQS, DBI, and DMI via read/write amplifiers 155 and the I/O circuit 160 according to the RDQS clock signals. The read data may be provided at a time defined by read latency information RL that can be programmed in the apparatus 100, for example, in a mode register (not shown in FIG. 1). The read latency information RL can be defined in terms of clock cycles of the CK clock signal. For example, the read latency information RL can be a number of clock cycles of the CK signal after the read command is received by the apparatus 100 when the associated read data is provided.

Write data can be supplied to the data terminals DQ, DBI, and DMI according to the WCK and WCKF clock signals. The write command may be received by the command decoder 115, which can provide internal commands to the I/O circuit 160 so that the write data can be received by data receivers in the I/O circuit 160 and supplied via the I/O circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the apparatus 100 (e.g., in the mode register). The write latency WL information can be defined in terms of clock cycles of the CK clock signal. For example, the write latency information WL can be a number of clock cycles of the CK signal after the write command is received by the apparatus 100 when the associated write data is received.

The I/O circuit 160 can include components for converting read and/or write data across different formats or arrangements (e.g., serial-to-parallel or parallel-to-serial) and/or controlling communication timing (e.g., sampling timing or output alignment) thereof. The I/O circuit 160 can include signal amplifiers and/or drivers that provide targeted voltages, currents, impedances, and/or other communication settings for communicating the data. In some embodiments, the I/O circuit 160 can include a speed selection mechanism 190 that adjusts one or more communication settings according to one or more characteristics (e.g., a speed) of the communicated signal. In other words, the I/O circuit 160 can be configured to selectively apply a first communication setting for signals having a first communication characteristic or a second communication setting for signals having a second communication characteristic.

As an illustrative example, in some embodiments, the speed selection mechanism 190 can include (1) a communication path configured to communicate signals between data processing circuits and corresponding I/O pads (e.g., DQ pads) and (2) an adjustment circuit coupled to the communication path and configured to adjust or equalize the communicated signal according to a signal speed. The communication path can be used to communicate both faster and slower signals. The communication path can include a set of drivers meeting a minimum requirement, such as for providing a higher fan-out configuration associated with the lower speed signal. The adjustment circuit can be configured to reduce destructive interferences, such as the ISI, within the higher speed signals communicated via the set of drivers. In one or more embodiments, the adjustment circuit can be configured to remove low-frequency and/or DC components within the communicated high speed signals. Details regarding the speed selection mechanism 190 are described below.

The memory array 150 communicating with I/O 160 can require a higher speed signal path, resulting in bandwidth limitations. Such limitations can yield ISI. In some embodiments, a communication path, transferring the I/O signals, may operate under various speed modes. For example, to accommodate a higher speed mode, the communication path can be designed to have a lower fan-out configuration. Alternatively, to accommodate a lower speed mode, the communication path can be designed to have a higher fan-out configuration design. Implementing such designs to the apparatus 100 will mitigate the bandwidth limitations.

The power supply terminals may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in the row decoder 140, the internal potentials $V_{OD}$ and $V_{ARY}$ can be used in the sense amplifiers included in the memory array 150, and the internal potential $V_{PERI}$ can be used in many other circuit blocks.

The power supply terminal may also be supplied with power supply potential $V_{DDQ}$. The power supply potential $V_{DDQ}$ can be supplied to the I/O circuit 160 together with the power supply potential VSS. The power supply potential $V_{DDQ}$ can be the same potential as the power supply potential $V_{SS}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the I/O circuit 160 so that power supply noise generated by the I/O circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a clock/enable signal from the command decoder 115, an input buffer can receive the clock/enable signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable (not shown in FIG. 1) from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide I/O clock signals. The I/O clock signals can be supplied to the I/O circuit 160 and can be used as timing signals for determining output timing of read data and/or input timing of write data. The I/O clock signals can be provided at multiple clock frequencies so that data can be output from and input to the apparatus 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The apparatus 100 can be connected to any one of a number of electronic devices capable of utilizing memory for the temporary or persistent storage of information, or a component thereof. For example, a host device of apparatus 100 may be a computing device such as a desktop or portable computer, a server, a hand-held device (e.g., a mobile phone, a tablet, a digital reader, a digital media player, etc.), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 100; although in other embodiments, the host device may be indirectly connected to memory device (e.g., over a networked connection or through intermediary devices).

Figure 2:
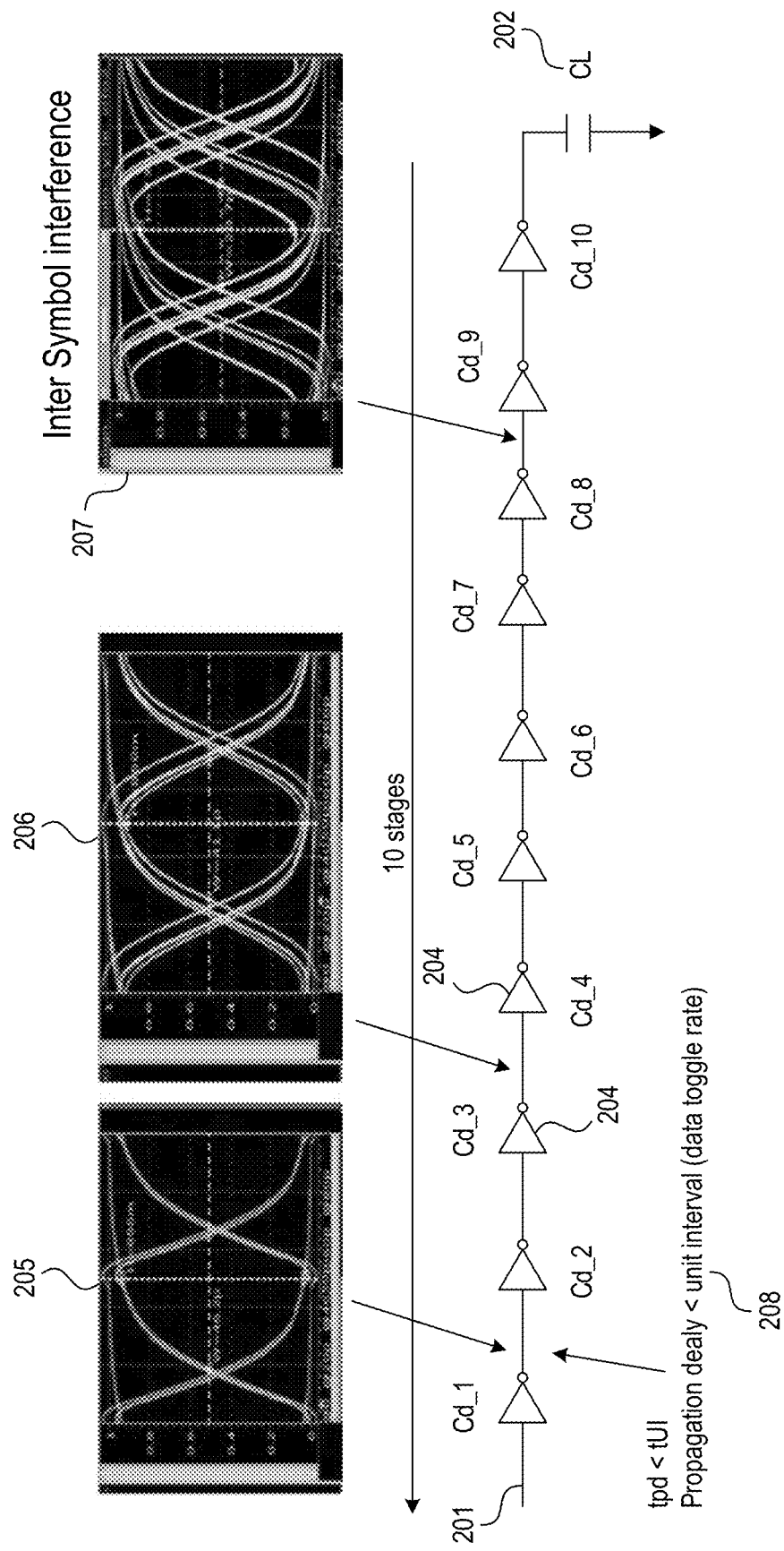
FIG. 2 is a circuit diagram of an example communication path.

FIG. 2 is a circuit diagram of an example communication path 201. The communication path 201 can receive and propagate an input signal 205 having a communication speed or frequency. FIG. 2 can illustrate an example relationship between a drive capacity and corresponding ISI for the communication path 201.

In some embodiments, the communication path 201 can include a set of drivers (e.g., a set of NOT gates, or inverters) configured to receive and propagate an input signal having a communicating rate. The set of drivers may be connected in series and have a targeted number of drivers sufficient for accommodating the communication speed, providing at least a predetermined drive capacity (fan out or FO), or both. For example, a lower stage ratio or a lower FO configuration can include a greater number of drivers for communicating higher speed signals. In comparison, a higher stage ratio or a higher FO configuration can include a lesser number of drivers for lower speed signals.

Figure 3:
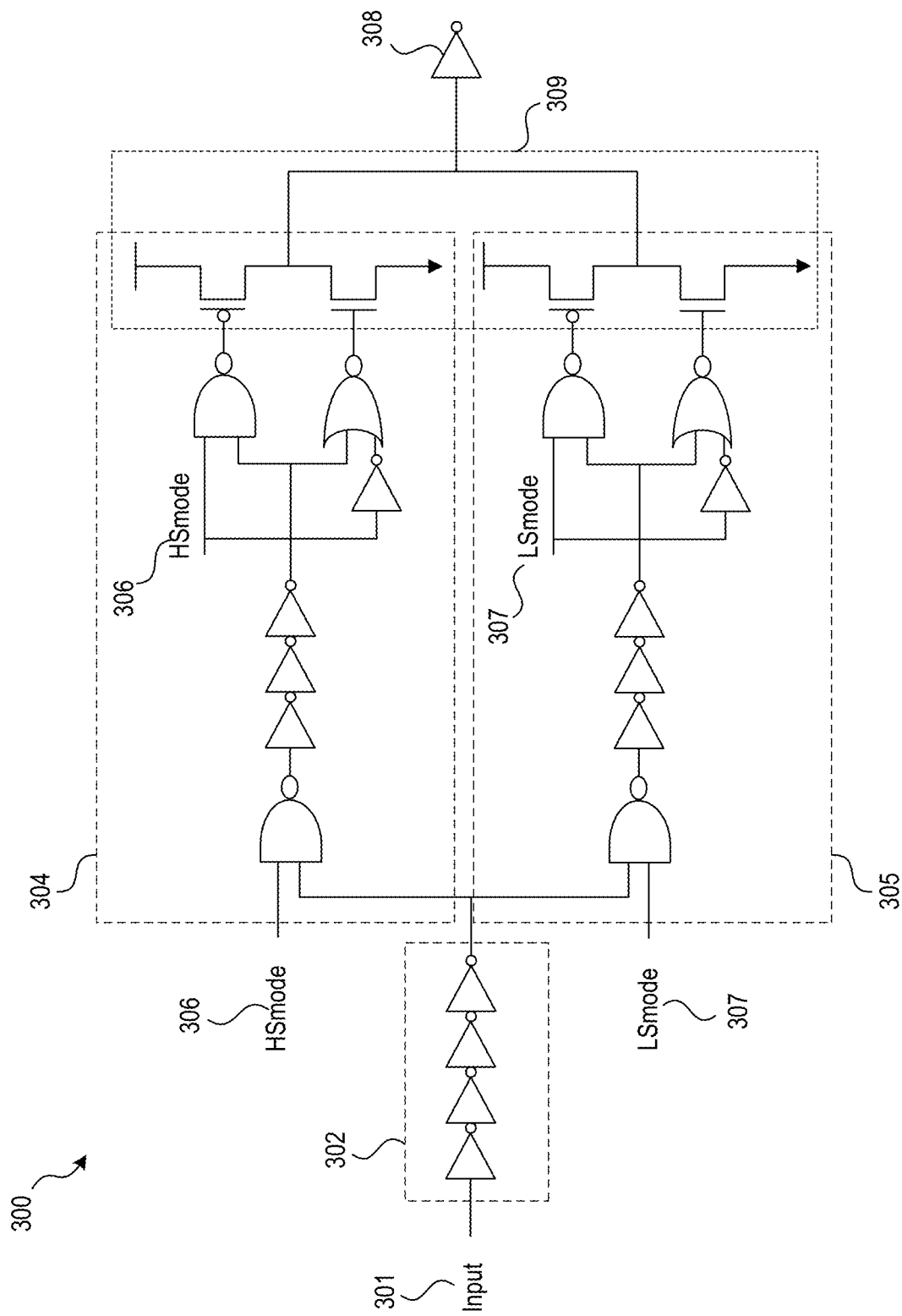
FIG. 3 is a schematic block diagram of an example mechanism for removing ISI according to a communication speed, while preserving power.

The communication path 201 can have a low FO configuration and receive an input signal 205 (e.g., a signal classified as higher speed, such as for DQ signals of GDDR6 DRAM devices). In some embodiments, the number of drivers can depend on the ratio between the capacitive load 202 and the driver 204 capability (e.g., the fan-out ratio). For example, a ten-stage inverter circuit can be used to establish an FO ratio of greater than 1 to drive a capacitive load, CL. As illustrated in FIG. 3, if the FO ratio is n, where n>1.0 (e.g., n=1.1, 1.5, 1.9, 2.1, etc.), then the input capacitance of each driver 204 of the ten-stage inverter circuit could be determined as:

$$Cd\_1 = \frac{Cd\_2}{n}, Cd\_2 = \frac{Cd\_3}{n}, Cd\_3 = \frac{Cd\_4}{n},$$

-continued $$Cd\_4 = \frac{Cd\_5}{n}, Cd\_5 = \frac{Cd\_6}{n}, Cd\_6 = \frac{Cd\_7}{n}, Cd\_7 = \frac{Cd\_8}{n},$$

$$Cd\_8 = \frac{Cd\_9}{n}, Cd\_9 = \frac{Cd\_10}{n}, Cd\_10 = \frac{Cd\_L}{n}.$$

For illustrative purposes, FIG. 2 shows ten-stage inverter circuit; however, it is understood that the communication path 201 can include any number of drivers.

The communication path 201 may inadvertently add ISI components while propagating the input signal 205 across the set of drivers. For example, increasing demand for faster devices can cause the input signal 205 to have a data toggle rate (e.g., communication speed) that is within a threshold from or exceeding a propagation speed 208 of one or more drivers in the communication path 201. Alternatively, or additionally, the one or more of the drivers may be inadvertently manufactured to have undesirable propagation delays. The insufficient propagation speed of the one or more drivers can introduce the ISI component when a new or next signal transition arrives before the corresponding driver completes the current signal transition. As a result, the ISI can shift and distort the overall shape of the communicated signal and cause signal processing errors downstream.

As illustrated in the signal captures 205-207 of FIG. 2, the ISI component can increase and worsen across the driver chain. This may reduce the clarity of signal transitions and the separation between transitions. Accordingly, the communication path 201 may provide an output signal to a load 202 that is different from the input signal 205 due to the introduced ISI 207.

FIG. 3 is a schematic block diagram of a multipath circuit 300 for communicating signals having different speeds across common endpoints. As an illustrative example, memory devices can be configured to accommodate data (DQ) signals having at least two communication speeds (e.g., a higher toggle rate and a lower toggle rate). The memory device, such as a DRAM, can operate in a corresponding mode (e.g., a higher speed mode or a lower speed mode) to process the corresponding DQ signal. As such, some memory devices may use the multipath circuit 300 to communicate the selectable speed signal between endpoints 301 and 308 (e.g., DQ pad and any other downstream processing circuit), To accommodate the different selectable speeds, the multipath circuit 300 can have at least a first path 304 and a second path 305 between the endpoints 301 and 308. The first and second paths 304 and 305 can have different drive capacities and/or driver speeds to accommodate the different signal speeds. For example, the first path 304 can have the low stage ratio with larger sized circuit components (e.g., drivers, logic gates, and the like) to communicate the faster speed signal. The second path 305 can have the high stage ratio (high FO) with smaller sized components to communicate the lower speed signal. In some embodiments, the multipath circuit 300 can include a commonly shared set of drivers 302 that provide an initial set of driving capacity regardless of the communication speed.

The multipath circuit 300 can have a path selector (e.g., a set of parallel NAND gates following the shared drivers 302) that are controlled by mode-setting signals 306 and 307 that reflect the speed-related operating mode of the device. For example, a first mode signal 306 can be active when the device is in high-speed mode, and a second mode signal 307 can be active when the device is in low-speed mode. Accordingly, the multipath circuit 300 can propagate the input signal (e.g., the DQ signal) through the first path 304 when the first mode signal 306 is active or through the second path 305 when the second mode signal 307 is active.

The multipath circuit 300 can have a combining circuit 309 configured to couple or route the first path 304 and the second path 305 to a common end point 308 (e.g., output node). In other words, the combining circuit 309 can rejoin the different paths to a common output. In some embodiments, the combining circuit 309 can include a wired OR or HIZ driver. The combining circuit 309 may require additional control circuitry, such as for responding to the active mode signals 306 and/or 307. In some embodiments, the combining circuit 309 (e.g., the HIZ driver) may require an initialization process that sets the active mode signals 306 and/or 307 to a set of predetermined values, such as 0 for one mode input (e.g., HSmode) and 1 for the other mode input (e.g., LSmode).

Figure 4:
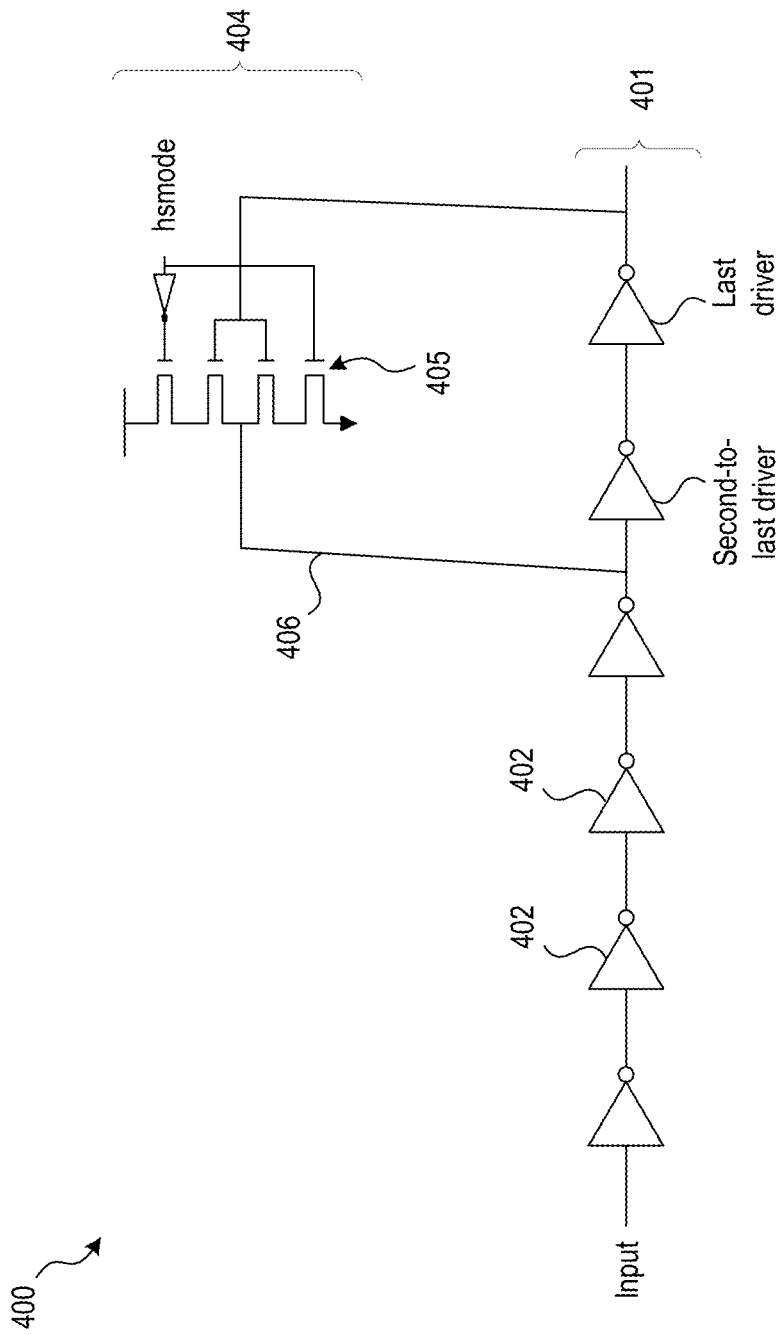
FIG. 4 is a schematic block diagram of a first communication circuit with an on-die feedback equalizer in accordance with an embodiment of the present technology.

FIG. 4 is a schematic block diagram of a first communication circuit 400 with an on-die feedback equalizer in accordance with an embodiment of the present technology. The first communication circuit 400 can include a set of serially connected drivers 402 (e.g., inverters) that corresponds to a signal path 401 coupled to an on-die feedback equalizer 404. The signal path 401 can be configured to accommodate signals having different rates or frequencies. For example, the signal path 401 can correspond to a DQ data path that accommodates or receives a faster data signal and a slower data signal. In other words, signals having different speeds can traverse the same path (e.g., the signal path 401) between the DQ pad and a downstream processing circuit.

To accommodate signals having different speeds, the signal path 401 can be configured to have a fan-out ratio (e.g., targeted size or load capacity for the drivers 402) that can support both speeds. In some embodiments, the signal path 401 can have a number and/or a size of the drivers 402 targeted to support a required power and/or a drive capacity for the lower speed signal.

In addition to the fan-out ratio, the signal path 401 can be coupled to an equalizer circuit 404 (e.g., an on-die equalizer or a filter) configured to address any ISI components in the communicated signal. For example, the equalizer circuit 404 can include a set of transistors 405 that are activated when the signal path 401 is used to communicate the higher speed signal (e.g., a high-speed mode (hsmode) signal). The equalizer circuit 404 can be connected in parallel to a subset of drivers located at or near the end portion of the signal path 401 (e.g., in parallel to a last driver and a second-to-last driver). The equalizer circuit 404 can be connected to the signal path 401 using a feedback loop 406 (1) for receiving a processed output of a preceding portion of the first signal and (2) for providing an output of the equalizer circuit 404 into the second-to-last driver to remove effects of the preceding portion of the signal from processing a latter portion of the first signal.

In some embodiments, the equalizer circuit 404 can include the set of transistors 405 connected between a power source and an electrical ground. The transistors connected to the power source and the electrical ground can be activated when the high-speed mode signal is active. One or more of the transistors in the middle portion can be activated according to an output of the signal path 401, and the corresponding output of the equalizer circuit 404 can be provided as a combining input into the last driver or second-to-last driver 402 in the signal path 401. Accordingly, a current output signal/bit (e.g., s[n]) or a derivative thereof can be provided via a feedback loop to a designated driver (e.g., second to the last driver) in an end portion of the path. At the designated driver, the fed back signal can be used to eliminate or suppress any remnant thereof (e.g., any residual effects of s[n]) from a subsequent signal/bit (e.g., s[n+2]). Alternatively, or additionally, the equalizer circuit 404 can be configured to suppress or filter out low frequency or DC components that correspond to the ISI. In some embodiments, the equalizer circuit 404 can be configured during a manufacturing process or a device initialization process (e.g., during testing or validation, and/or before deploying the apparatus 100 of FIG. 1).

The equalizer circuit 404 coupled in parallel to the signal path 401 can provide reduced power consumption and reduced circuit footprint, such as in comparison to the multipath circuit 300 of FIG. 3. For example, given the simpler feedback function of the equalizer circuit 404, the equalizer circuit 404 can include fewer and/or smaller components than the first path 304 of FIG. 3. Moreover, the signal path 401 can accommodate the multiple signal speeds, thereby eliminating additional communication paths and the corresponding components. Further, the first communication circuit 400 can reduce or eliminate the path-selecting sub-circuit (e.g., parallel NANDs in FIG. 3) and/or recombining circuits (e.g., the combining circuit 309 of FIG. 3), thereby further reducing the power consumption and the circuit footprint.

The equalizer circuit 404 coupled in parallel to the signal path 401 can further eliminate any initialization of one or more drivers in the signal path 401. For comparison, conventional devices may require a process to initialize the drivers (e.g., to prevent occurrence of a HIZ state) so that the larger or higher capacity drivers can function as intended, such as in relaying higher speed signals. In contrast, the first communication circuit 400 can remove the separately tuned path, thus eliminating any corresponding initialization process.

Figure 5:
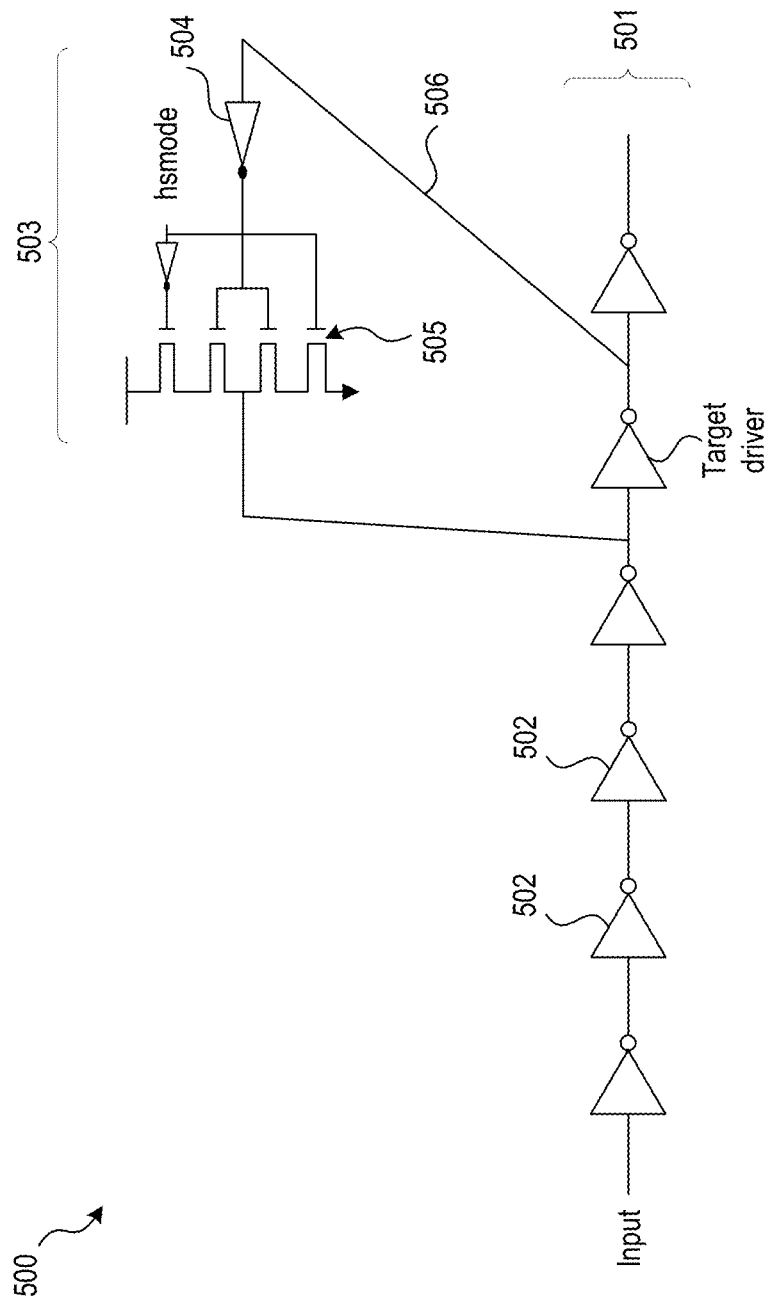
FIG. 5 is a schematic block diagram of a second communication circuit with an on-die feedback equalizer in accordance with an embodiment of the present technology.

FIG. 5 is a schematic block diagram of a second communication circuit 500 with an on-die feedback equalizer in accordance with an embodiment of the present technology. The second communication circuit 500 can include a set of serially connected drivers 502 (e.g., inverters) that correspond to a signal path 501 coupled to an on-die feedback equalizer 503. Similar to the signal path 401 of FIG. 4, the signal path 501 can be configured to accommodate signals having different rate or frequencies. For example, the signal path 501 can accommodate signals having different speeds traversing the same path (e.g., the signal path 501) between the DQ pad and a downstream processing circuit.

To accommodate signals having different speeds, the signal path 501 can be configured to have a fan-out ratio (e.g., targeted size or load capacity for the drivers 502) that can support both speeds. In some embodiments, the signal path 501 can have a number and/or a size of the drivers 502 targeted to support a required power and/or a drive capacity for the lower speed signal.

Similar to the signal path 401 of FIG. 4, the fan-out ratio can be coupled to an equalizer circuit 503 (e.g., an on-die equalizer or a filter) configured to address any ISI components in the communicated signal. For example, the equalizer circuit 503 can include a set of transistors 505 that are activated when the signal path 501 is used to communicate the higher speed signal (e.g., a high-speed mode (hsmode) signal) and connected in parallel to a subset of drivers located at or near the end portion of the signal path 501 (e.g., in parallel to a target driver). Similar to the equalizer circuit 404 of FIG. 4, the equalizer circuit 503 can be connected to the signal path 501 using a feedback loop 506. For example, an inverter 504 can be positioned on the feedback loop 506 (1) for receiving and inverting the processed output of the target driver and (2) for providing the equalizer circuit 503 with the inverted processed output from the inverter 504. The equalizer circuit 503 can then provide an output into the target driver to remove effects of the preceding portion of the signal.

In some embodiments, the equalizer circuit 503 can include a set of transistors 505 connected between a power source and an electrical ground. Similar to the set of transistors 405 of FIG. 4, the set of transistors 505 can be activated when the high-speed mode signal is active. For example, one or more of the transistors in the middle portion can be activated according to an output of the signal path 501, and the corresponding output of the equalizer circuit 503 can be provided as a combining input into the target driver 502 in the signal path 501. Moreover, the equalizer circuit 504 can be configured to suppress or filter out low frequency or DC components that correspond to the ISI.

As described above, in comparison to the multipath circuit 300 of FIG. 3, the equalizer circuit 503 coupled in parallel to the signal path 501 can provide reduced power consumption and a reduced circuit footprint. Moreover, the inverter 504 can prevent the processed output of the target driver from prematurely arriving to the equalizer circuit 503. Further, the inverter can decrease the speed of the processed output of the target driver such that it arrives after the equalizer circuit 503 provides an output into the target driver. Additionally, as described above, the equalizer circuit 503 coupled in parallel to the signal path 501 can further eliminate the initialization of one or more drivers in the signal path 501. For example, the multipath circuit 300 of FIG. 3, or other conventional devices may require a process to initialize the drivers (e.g., to prevent occurrence of a HIZ state), but the second communication circuit 500 can remove the separately tuned path, thus eliminating the need for any corresponding initialization process.

For illustrative purposes, the first communication circuit 400 and the second communication circuit 500 in FIGS. 4 and 5, respectively, are shown with an even number of drivers 402 and 502 positioned in the feedback loop 406 and 506. However, it is understood that the feedback loop 406 and 506 may contain an odd number (e.g., three, five, etc.) of drivers 402 and 502. Further, in some embodiments, the position of the path for the feedback loop 406 and 506 may be placed at different node locations on the signal path 401 and 501 of the first communication circuit 400 and the second communication circuit 500, respectively.

Figure 6:
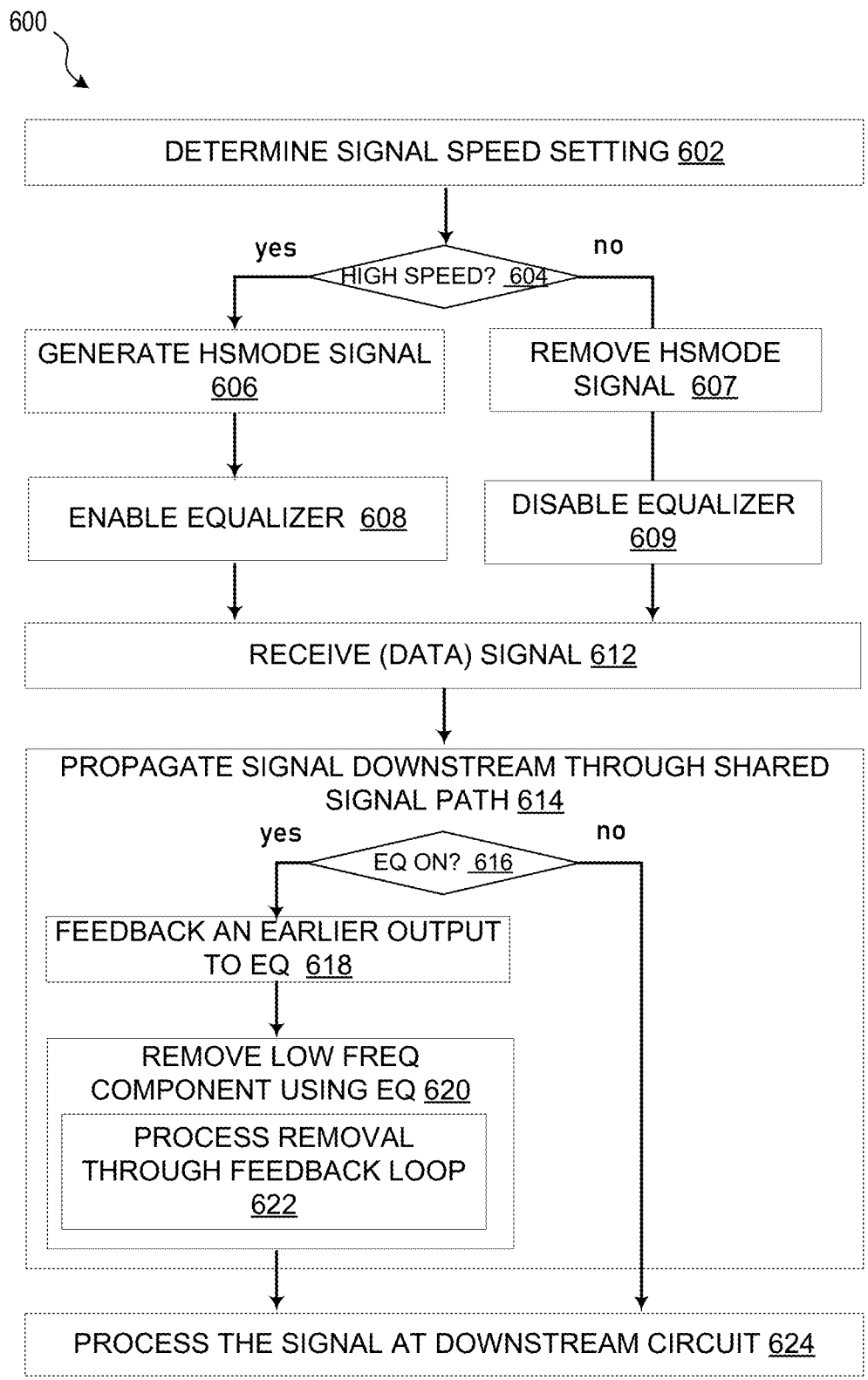
FIG. 6 is a flow diagram illustrating an example method of operating an apparatus in accordance with an embodiment of the present technology.

FIG. 6 is a flow diagram illustrating an example method 600 of operating an apparatus (e.g., the apparatus 100 of FIG. 1, the I/O circuit 160 of FIG. 1, the speed selection mechanism 190 of FIG. 1, the first communication circuit 400 of FIG. 4, the second communication circuit 500 of FIG. 5, or any combination thereof) in accordance with an embodiment of the present technology. The method 600 may be for reducing or removing the ISI while accommodating signals with selectable/adjustable speeds as described above.

At block 602, the apparatus 100 can determine a signal speed setting. The determined signal speed setting can represent a communication rate of an incoming signal. For example, the DRAM device or die can determine whether the DQ communication setting is in higher speed or lower speed. The apparatus 100 can determine the signal speed setting according to a command, a signal, and/or a setting controlled by an external device (e.g., the controller). In some embodiments, the apparatus 100 can determine the signal speed based on accessing or reading from a mode register.

At decision block 604, the apparatus 100 can determine whether the signal speed setting corresponds to a higher speed mode (e.g., for communicating higher frequency DQ signal). At block 606, the apparatus 100 can generate a corresponding internal control signal (e.g., hsmode of FIGS. 4 and 5) in response to determining the higher speed mode is determined. Using the internal control signal, the apparatus 100 can enable an equalizer (e.g., an on-die ISI management circuit, such as the on-die feedback equalizer 404 of FIG. 4 or the on-die feedback equalizer 504 of FIG. 5) as illustrated in block 608.

Otherwise, when the signal speed setting does not correspond to the higher speed mode, the apparatus 100 can remove the internal control signal as illustrated at block 607. Accordingly, the apparatus 100 can disable the equalizer as illustrated at block 609.

At block 612, the apparatus 100 can receive an incoming signal (e.g., the DQ signal) that corresponds to the determined signal speed setting. In other words, the received incoming signal can have the communication rate associated with the determined signal speed. The received signal can have an associated sequence or order, such as for a first bit, a second bit, a last bit, or the like within the received data word. As described above for blocks 606-612, the apparatus 100 can receive the higher speed signals with the equalizer enabled. Otherwise, the apparatus 100 can receive the incoming signals without the equalizer in active state.

At block 614, the apparatus 100 can propagate the received/incoming signal downstream through a shared signal path (e.g., the communication path 401 of FIG. 4 or the communication path 501 of FIG. 5) for subsequent data processing (e.g., write operation). As described above the communication path can include a set of serially connected drivers that are configured to accommodate both the faster signal and the slower signal. For example, the set of drivers can have the FO ratio or a drive capacity associated with or sufficient for the slower signal rate. Additionally, one or more of the target drivers (e.g., drivers in the second/latter half of the path) can be connected in parallel with the equalizer using a feedback loop. The equalizer can be configured to remove a lower frequency component (e.g., the DC component or frequency components lower than a predetermined threshold) from a currently processed signal portion using a feedback of an earlier signal portion.

As such, the apparatus 100 can selectively process the signal, thereby propagating the signal according to whether the equalizer was enabled (activated to an on state) at block 608 or if the equalizer was disabled (deactivated to an off state) at block 609 as illustrated at decision block 616. When the equalizer is on, the apparatus 100 can feed back an earlier output from the parallel connected driver(s) to the EQ as illustrated in block 618. For example, the output from the last driver can be fed back through the feedback loop 406 of FIG. 4 to the equalizer circuit 404. Also, the output from the target driver can be fed back through the feedback loop 506 of FIG. 5 and an inverter 503 to the equalizer circuit 505.

At block 620, the apparatus 100 can use the equalizer to reduce a low frequency component (e.g., DC component or a component of the signal having a frequency less than a predetermined threshold). The equalizer and/or the feedback loop can be configured to provide a duplicate or a derivative (e.g., delayed, scaled, or otherwise adjusted waveform) of an earlier portion of the signal (e.g., s[n−1], s[n−2], etc.) that was processed by the target driver(s). The resulting output of the equalizer can be provided to an input of the target driver(s) for processing a current signal (e.g., s[n]). At block 622, the communication path can use the equalizer output (e.g., feedback product) to remove or reduce any residual effects remaining from the earlier portion of the signal from the current signal.

At block 624, the output of the communication path can be provided to a downstream circuit, and the downstream circuit can process the communicated signal (e.g., implementing a write operation). The output of the communication path can include the higher speed signal that was processed by the equalizer to reduce or remove the ISI components or the lower speed signal that was propagated without additional ISI processing.

Figure 7:
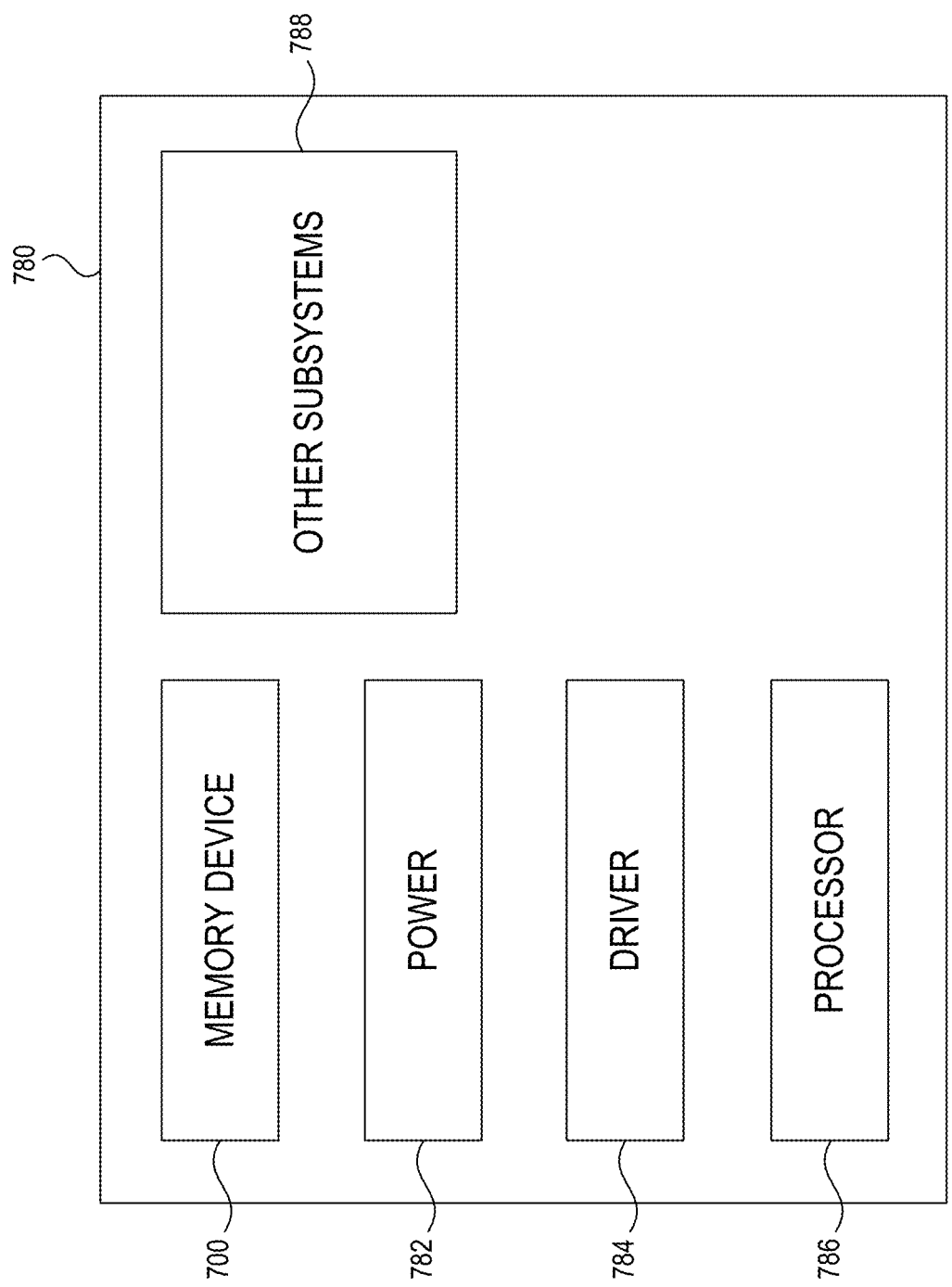
FIG. 7 is a schematic view of a system that includes an apparatus in accordance with an embodiment of the present technology.

FIG. 7 is a schematic view of a system that includes an apparatus in accordance with embodiments of the present technology. Any one of the foregoing apparatuses (e.g., memory devices) described above with reference to FIGS. 1-6 can be incorporated into any of a myriad of larger and/or more complex systems, a representative example of which is system 780 shown schematically in FIG. 7. The system 780 can include a memory device 700, a power source 782, a driver 784, a processor 786, and/or other subsystems or components 788. The memory device 700 can include features generally similar to those of the apparatus described above with reference to FIGS. 1-6, and can therefore include various features for performing a direct read request from a host device. The resulting system 780 can perform any of a wide variety of functions, such as memory storage, data processing, and/or other suitable functions. Accordingly, representative systems 780 can include, without limitation, hand-held devices (e.g., mobile phones, tablets, digital readers, and digital audio players), computers, vehicles, appliances and other products. Components of the system 780 may be housed in a single unit or distributed over multiple, interconnected units (e.g., through a communications network). The components of the system 780 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-7.

What is claimed is:

1. A semiconductor die, comprising:
   a communication path including a set of drivers, the communication path configured to facilitate communication of (1) a first signal having a first speed in a first mode and communication of (2) a second signal having a second speed slower than the first speed in a second mode; and
   an on-die inter-symbol interference (ISI) management circuit connected in parallel to at least a portion of the communication path, the on-die ISI management circuit configured to be activated in the first mode to reduce a lower frequency component of the first signal.

2. The semiconductor die of claim 1, wherein the on-die ISI management circuit is coupled to the communication path in parallel to a portion within a latter half of the communication path.

3. The semiconductor die of claim 2, wherein the on-die ISI management circuit is coupled in parallel to one or more drivers in the set of drivers located within a threshold range from an output end of the communication path.

4. The semiconductor die of claim 3, wherein the on-die ISI management circuit is coupled in parallel to last two drivers located on the communication path.

5. The semiconductor die of claim 4, wherein the on-die ISI management circuit is connected to the communication path using (1) a feedback path for receiving a processed output of a preceding portion of the first signal from a last driver in the communication path, and (2) a return path connected before a second-to-last driver on the communication path for providing an output of the on-die ISI management circuit into the second-to-last driver to remove effects of the preceding portion of the first signal from processing a latter portion of the first signal.

6. The semiconductor die of claim 2, wherein the on-die ISI management circuit is coupled to the communication path in parallel to a target driver located between a first driver and a last driver on the communication path.

7. The semiconductor die of claim 6, wherein the target driver is connected using a feedback path that (1) provides a processed output of the target driver for a preceding portion of the first signal as an input to the on-die ISI management circuit and (2) provides an output of the on-die ISI management circuit as an input to the target driver for removing effects of the preceding portion from processing a latter portion of the first signal.

8. The semiconductor die of claim 7, wherein the on-die ISI management circuit includes:

an inverter configured to receive and invert the processed output of the target driver; and
a processing circuit configured to generate the output of the on-die ISI management circuit based on the inverted processed output from the inverter.

9. The semiconductor die of claim 1, wherein the on-die ISI management circuit is a low pass filter including passive components.

10. The semiconductor die of claim 1, wherein the on-die ISI management circuit includes a switch configured to implement reduction of the on-die ISI according to the first mode signal that is active when the communication path facilitates communication of the first signal.

11. The semiconductor die of claim 1, wherein the communication path is further configured with a fan-out ratio associated with the second signal, wherein the fan-out ratio corresponds to a number of gate inputs driven by the output of another single logic gate.

12. The semiconductor die of claim 1, wherein the on-die ISI management circuit includes:
   a source input; and
   a set of complementary transistors positioned in series with the source input, wherein the set of complementary transistors are configured to use the source input and generate an output that is provided as an input to a driver in the set of drivers.

13. A method of operating an apparatus to process on-die inter-symbol interference (ISI), the method comprising:
   determining a signal speed setting representative of a communication rate of an incoming signal, wherein the signal speed corresponds to at least a first mode for a higher communication rate and a second mode for a slower communication rate;
   receiving the incoming signal having the communication rate associated with the determined signal speed, wherein the incoming signal includes a first portion and a second portion following the first portion; and
   propagating the incoming signal through a communication path for subsequent data processing,
      wherein propagating the incoming signal includes selectively processing the first portion according to the signal speed setting, the selective processing including using the first portion to remove the ISI in processing of the second portion.

14. The method of claim 13, wherein propagating the incoming signal includes activating an on-die ISI management circuit when the signal speed setting is determined as the higher communication rate, wherein the on-die ISI management circuit is (1) connected in parallel to the communication path or a portion thereof and (2) configured to use the first portion to remove the corresponding ISI in processing of the second portion.

15. The method of claim 14, wherein:
   the communication path includes a set of drivers connected in series configured to receive and propagate the incoming signal;
   the selective processing includes:
      providing a feedback input from a target driver in the set of drivers into the on-die ISI management circuit, wherein the output from the target driver corresponds to the first portion; and
      providing a feedback output from the on-die ISI management circuit to a point in the communication path that is before an output of the target driver, wherein the feedback output corresponds to the first portion used to remove the corresponding ISI in processing of the second portion at or after the point in the communication path.

16. The method of claim 15, wherein the target driver and the point in the communication path are within a latter half of the set of drivers.

17. The method of claim 16, wherein:
the target driver is a last driver in the set of drivers; and
the point in the communication path corresponds to an input to a second-to-last driver.

18. The method of claim 16, wherein the point in the communication path corresponds to an input to the target driver.

19. A dynamic random-access memory (DRAM) die, comprising:
a data (DQ) pad configured to communicate data signals with an external circuit, wherein the communicated data signals include at least a lower speed signal and a higher speed signal;
a communication path coupled to the DQ pad, the communication path configured to propagate: (1) the higher speed signal in a first mode and (2) the lower speed signal in a second mode for subsequent processing; and
an internal inter-symbol interference (ISI) management circuit connected in parallel to at least a portion of the communication path, the internal ISI management circuit configured to reduce a lower frequency component that is below a threshold frequency from the higher speed signal or a processing result thereof for reducing an effect from an earlier portion of the higher speed signal during propagation of a later portion of the higher speed signal.

20. The dynamic random-access memory (DRAM) die of claim 19, wherein:
the communication path includes a set of drivers; and
the internal ISI management circuit (1) is connected in parallel using a feedback loop to one or more drivers located within a second half of the set of drivers in the communication path, (2) includes a set of complementary transistors connected to a source voltage and controlled by an earlier output from the one or more drivers, and (3) generates a feedback output from the set of complementary transistors, wherein the feedback output corresponds to the earlier portion and is provided as an additional input to the one or more drivers for use during the propagation of the later portion of the higher speed signal.

* * * * *